Jan. 20, 1953   R. B. PRESSLER   2,626,104
AUTOMATIC REPEATING PREDETERMINED STOP MECHANISM
Filed March 3, 1950   5 Sheets-Sheet 1
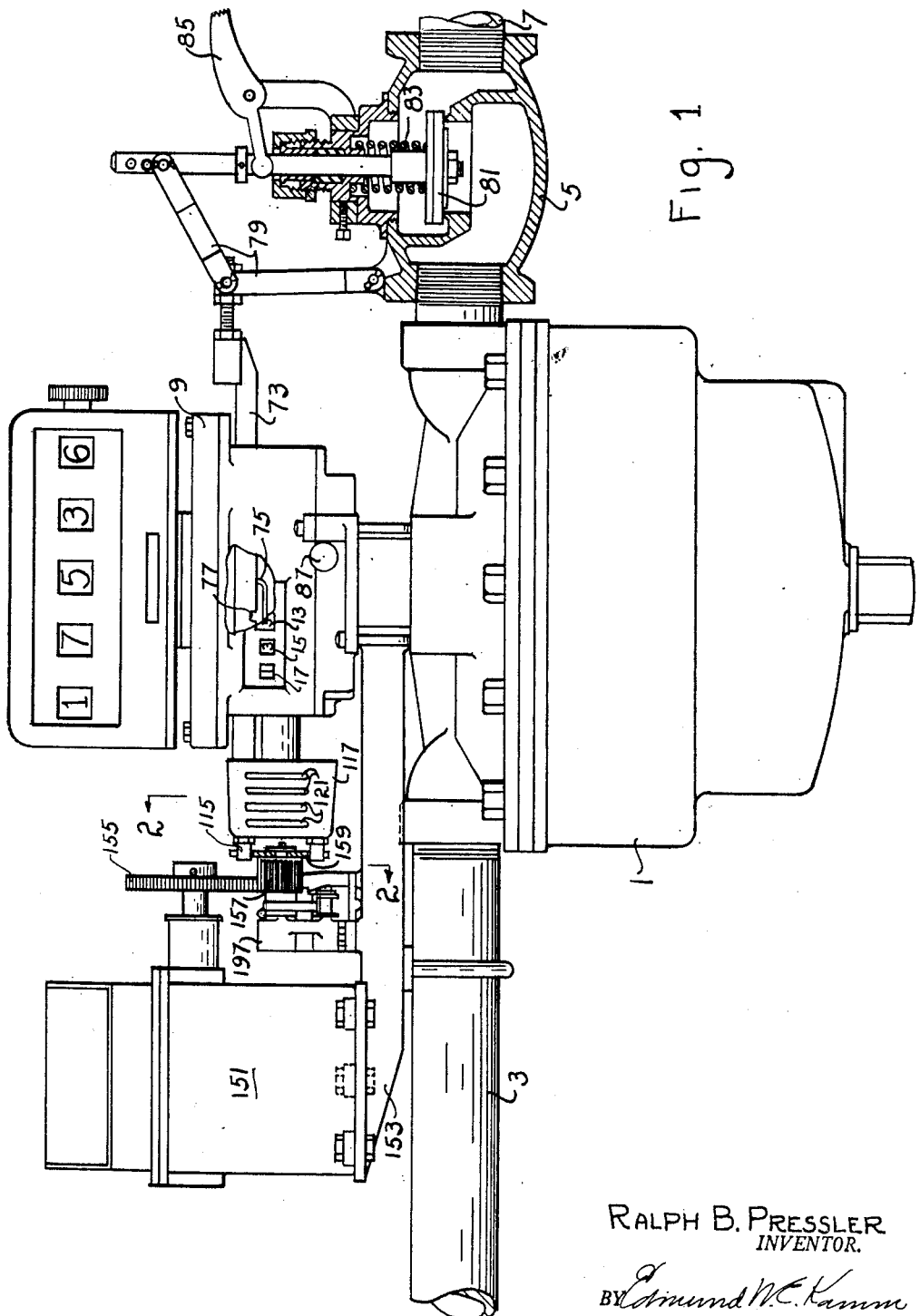
RALPH B. PRESSLER
INVENTOR.
BY Edmund W. C. Kamm
ATTORNEY

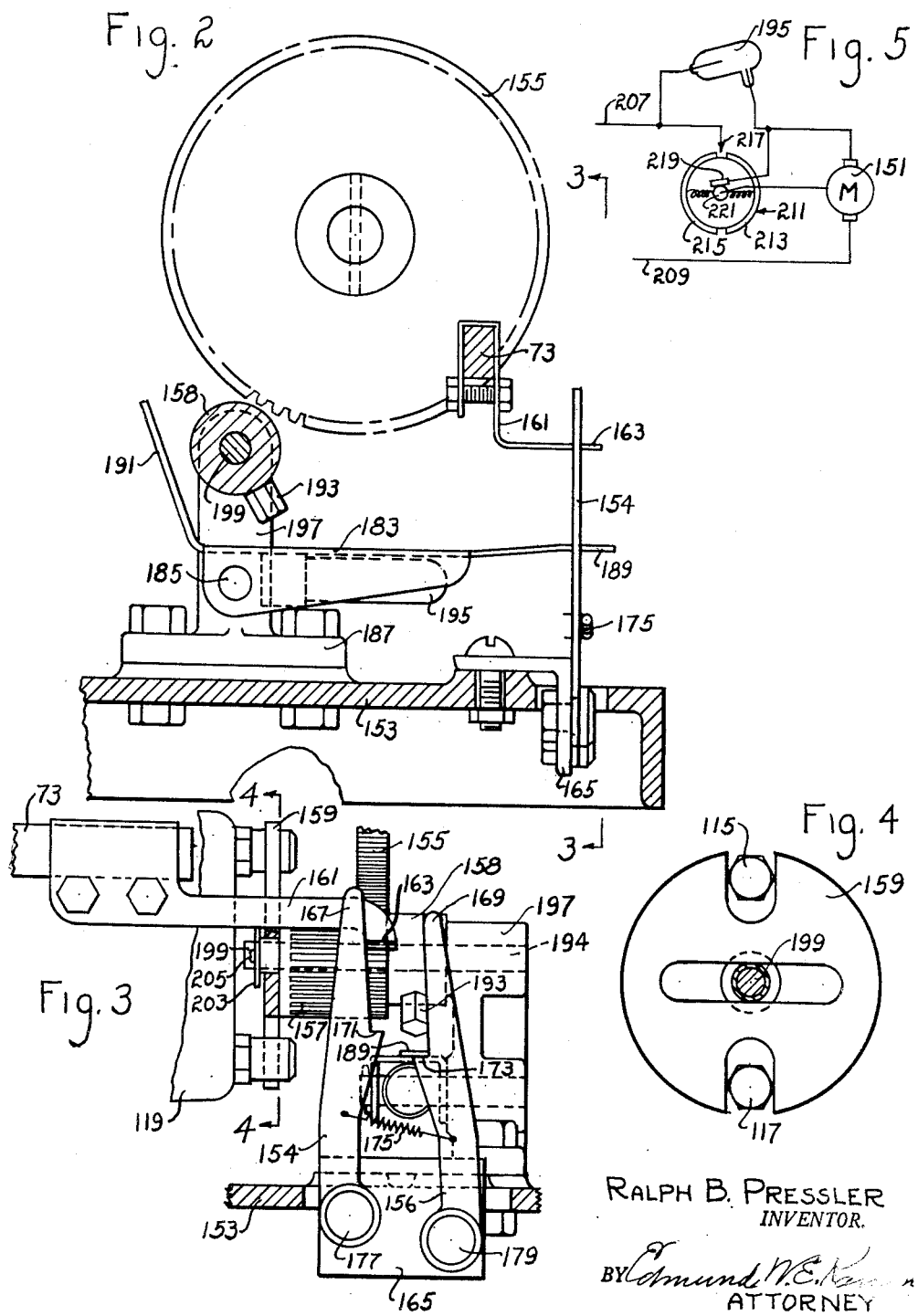

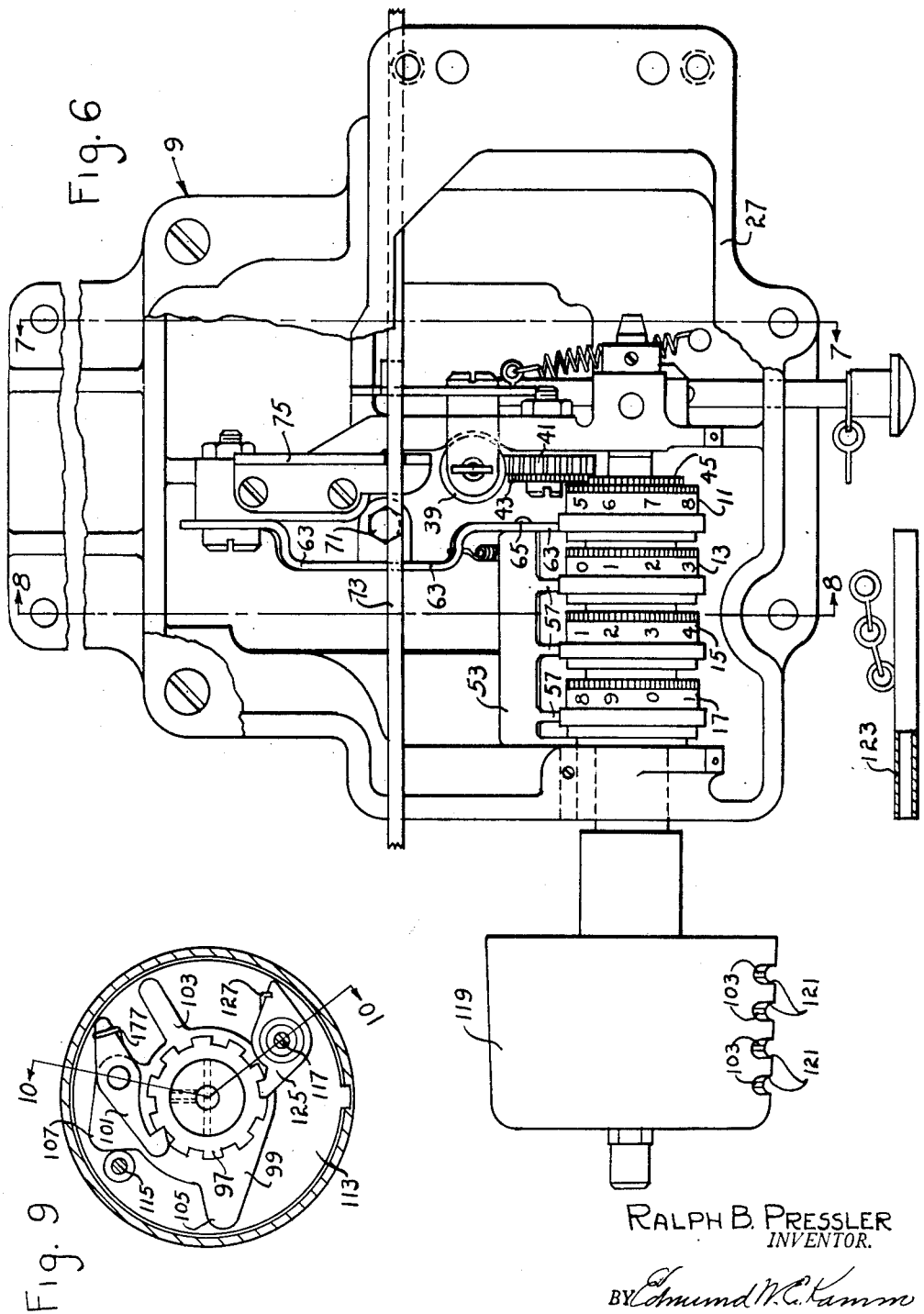

RALPH B. PRESSLER
*INVENTOR.*

BY Edmund W. C. Kamm
ATTORNEY

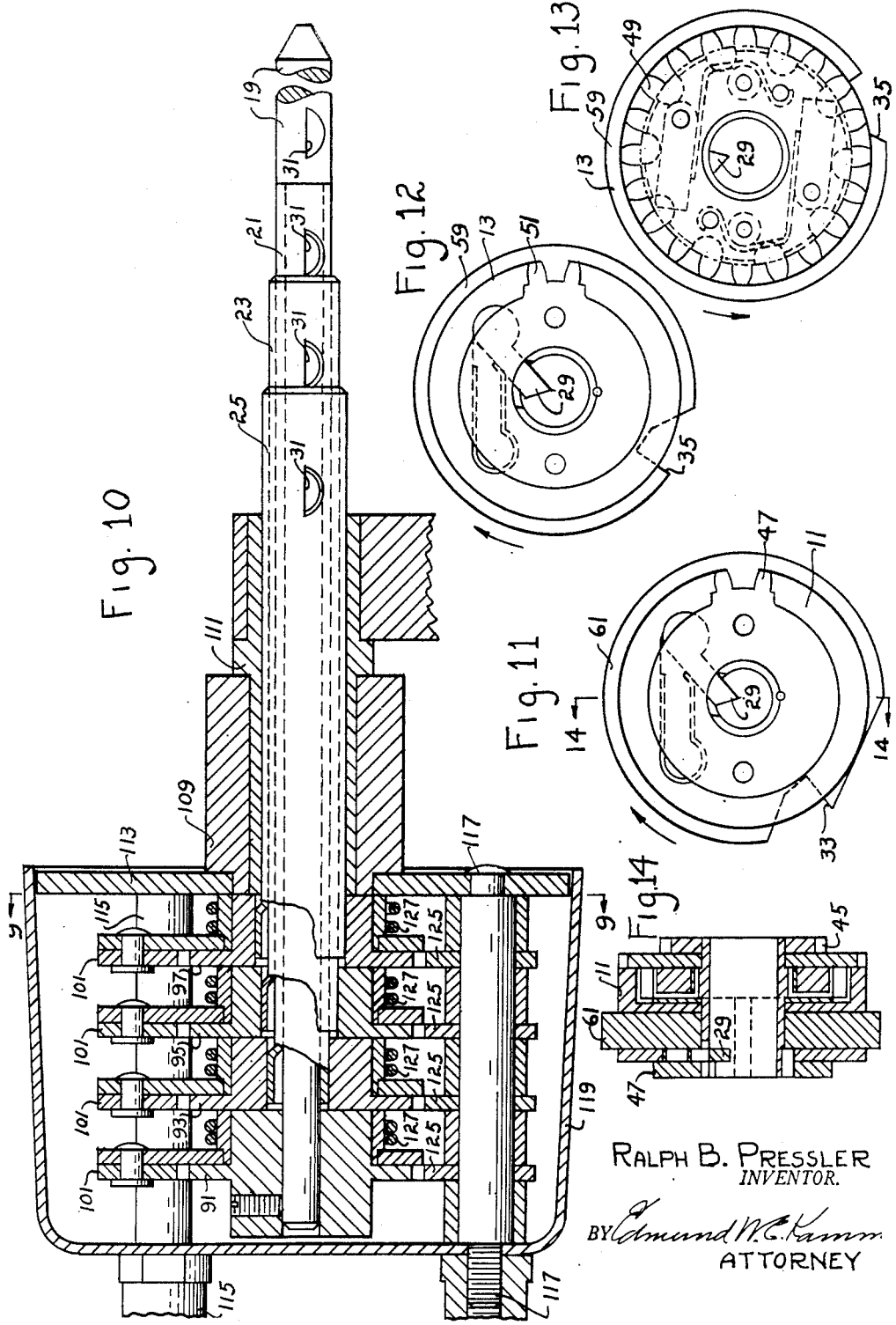

Patented Jan. 20, 1953

2,626,104

UNITED STATES PATENT OFFICE 2,626,104

AUTOMATIC REPEATING PREDETERMINED STOP MECHANISM

Ralph B. Pressler, Fort Wayne, Ind., assignor to Bowser, Inc., Fort Wayne, Ind., a corporation of Indiana Application March 3, 1950, Serial No. 147,423

7 Claims. (Cl. 235—132)

This invention relates to an automatic repeating predetermined stop mechanism. More specifically, it relates to a mechanism which is set in motion by the operation of the stop mechanism for resetting the latter for an additional repeat cycle.

It is an object of the invention to provide a mechanism which is positive in operation.

Another object of the invention is to provide means for resetting the stop mechanism at the end of the cycle thereof.

Yet another object of the invention is to provide power means for resetting the stop mechanism.

A further object is to provide means responsive to the resetting of the stop mechanism for stopping the power means.

Another object of the invention is to condition the resetting means, at the time the stop mechanism starts operation, for starting when the stop mechanism completes its operation.

These and other objects will become apparent from a study of this specification and the drawings which are attached hereto and are made a part hereof and in which:

Figure 1 is a side elevation of the stop mechanism and stop resetting mechanism applied to a liquid meter and flow line.

Figure 2 is a sectional view taken substantially on the line 2—2 of Figure 1 showing the switch operating mechanism.

Figure 3 is a right end elevation of the apparatus taken substantially on line 3—3 of Figure 2.

Figure 4 is a detailed elevation taken on line 4—4 of Figure 3 showing the motor drive connection to the stop mechanism.

Figure 5 is a wiring diagram showing the motor control system.

Figure 6 is a plan view of the predetermined stop mechanism.

Figure 9 is a sectional view taken substantially on the line 9—9 of Figure 10 showing the presetting means.

Figure 10 is a sectional view taken substantially on line 10—10 of Figure 9 showing the presetting means and telescopic shafts.

Figure 11 is an elevation of the units wheel and the trip cam.

Figure 12 is an elevation of the higher order wheels and cam.

Figure 13 is a rear view of the wheel of Figure 12.

Figure 14 is a sectional view taken substantially on the line 14—14 of Figure 11.

Referring to Figure 1, the mechanism is shown applied to a liquid dispensing system, although it is applicable to any predetermined stop controlled system.

Numeral 1 represents a liquid meter which is connected to a fluid supply pipe 3, a discharge valve 5 and a discharge pipe 7.

Figure 7:
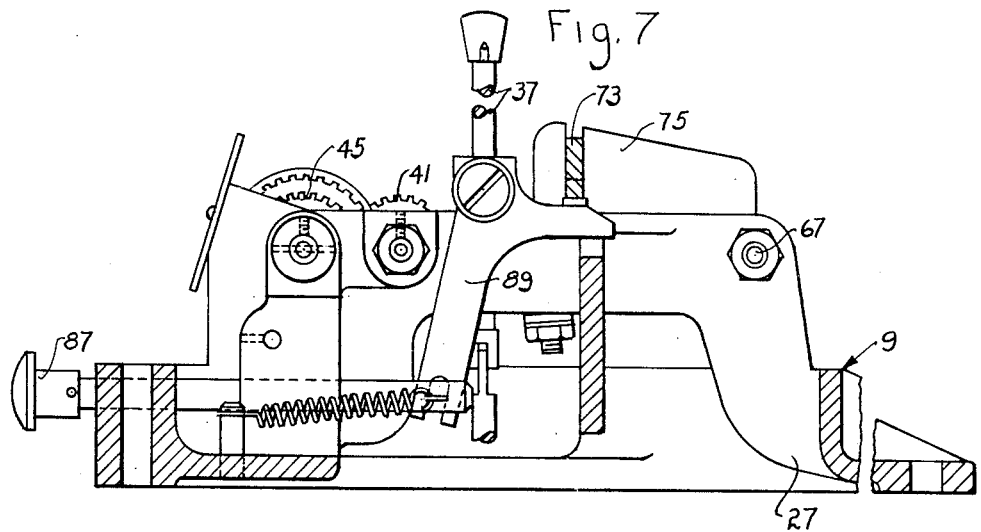
Figure 7 is a sectional view taken substantially on the line 7—7 of Figure 6 showing part of the trip mechanism.
Figure 8:
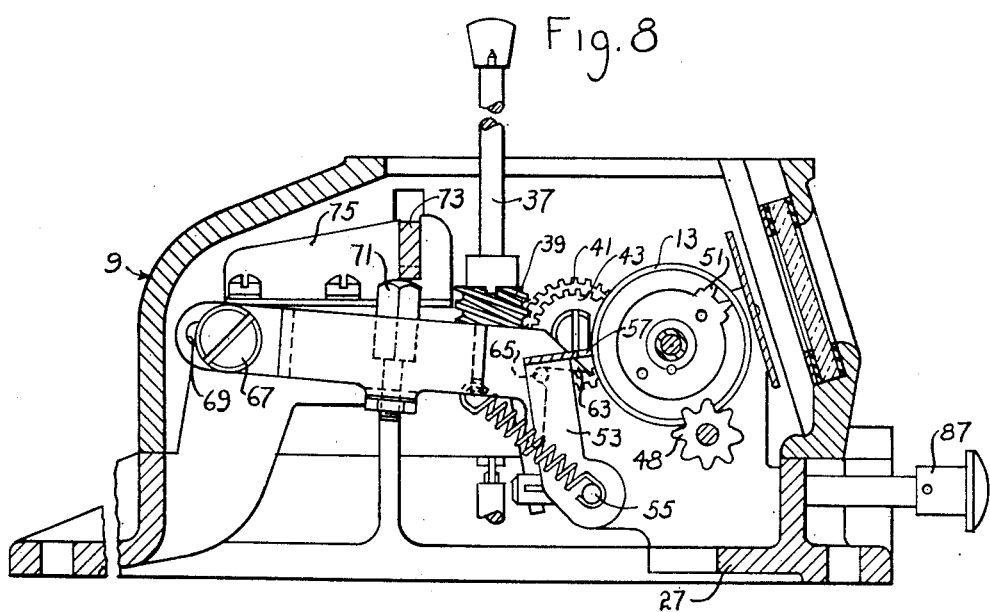
Figure 8 is a sectional view taken substantially on the line 8—8 of Figure 6 showing the remainder of the trip mechanism.

A presettable stop mechanism 9 which may be any suitable repeating stop mechanism is connected to be driven by the meter. One form of such a mechanism is shown in Figures 6 to 14 in which a units wheel 11 and a number of higher order wheels 13, 15 and 17 are mounted on the telescopic shafts 19, 21, 23 and 25 respectively, which are rotatably supported in a frame 27.

Each of the wheels has a pawl 29 which engages a notch 31 in its associated shaft so that rotation of the shaft will rotate the wheel.

The units wheel 11 also has a cam 33 and each of the other wheels has a cam 35 for controlling the tripping of the predetermined stop mechanism, as will be explained.

The meter drives a shaft 37 which drives a gear train comprising a worm 39, a worm wheel 41, a gear 43 and the gear 45 on the units wheel 11. The transfer pinion 47 on this wheel transmits a $\frac{1}{10}$ revolution to the tens wheel through the idler pinion 48 and gear 49. Similar transfer pinions 51 on the higher order wheels, meshing with the gears 49 of the adjacent higher order wheel effect a similar advance thereof in a well known manner.

A bail 53 is pivoted at 55 and has cam followers 57 which ride on the surfaces of the cams 59 of the higher order wheels. An actuating finger 63 is held out of engagement with the units cam 61 by reason of its contact with a pin 65. The finger itself is pivoted at 67 to the frame 27 by a slot 69. It carries a trip button 71 which underlies a trip bar 73 which is mounted for endwise sliding motion in the frame 27.

A notched latch plate 75 enters a notch 77 in the lower edge of the bar 73 when it is in the valve open position.

The end of the trip bar is connected by links 79 to the body and steam of the valve, the poppet 81 of which is held on its seat by a spring 83. The valve lever 85 lifts the poppet against the action of the spring.

A push rod 87 operates a bell crank 89 one arm of which underlies the trip bar 73 so that a push on the rod will disengage the notch 77 and latch 75.

As shown in Figures 9 and 10, the shafts 19, 21, 23 and 25 have respectively mounted thereon the ratchets 91, 93, 95 and 97. Mounted for oscillation on the hub of each ratchet is a pawl plate 99 which has a stepping pawl 101 pivoted thereon. The pawl plate also has lever 103 and two stops 105 and 107 projecting therefrom.

A bushing 109 is rotatably mounted on the bearing 111 fixed in the frame 27 and carries a radial flange 113 to which are fixed two studs 115 and 117. A cap 119 is fixed to the studs and is circumferentially slotted at 121 in the region of the levers 103 so that the handle 123 (Figure 6) may be inserted therethrough.

The stud 115 serves as a post for the stops 105, 107 to limit the oscillation of the pawl plate 99 while stud 117 serves as the pivot post for the ratchet holding pawl 125. Both pawls 125 and 101 are urged toward their ratchet by springs 127 and 177.

Predetermined operation

When it is desired to preset the predeterminer, the handle 123 is inserted through the slot 121 of cap 119 and onto the lever 103 of the outermost pawl plate. The handle is oscillated to rotate shaft 19 step by step until the units wheel 11 is set to the desired number.

The higher order wheels are similarly set and the handle is withdrawn. Ratchets 125 hold the setting.

When the valve lever 85 is depressed, poppet 81 is opened against the action of spring 83 and links 79 move trip bar 73 to the left, Figures 1 and 6, until the notch 77 engages latch 75. As the meter operates, the units wheel 11 is driven and transfers rotation stepwise to the next adjacent wheel 13 and so forth. The cam notches 35 on wheels 13, 15 and 17 will eventually line up with the followers 57. This permits the bail 53 to rotate clockwise (Figure 8) and the finger 63 engages the cam 61 of the units wheel. When it drops into notch 33 thereof, the finger pivots upwardly about 67 and button 71 lifts the trip bar free of latch 75 so that spring 83 may close the valve 81.

To secure repeated discharges of the same quantity of liquid, it is necessary merely to rotate the cap 119 two complete revolutions so that notches 31 on the telescopic shafts will pick up and realign the pawls 29 of the wheels.

Automatic reset

In order to accomplish this resetting automatically, an electric motor 151 is mounted on a base 153 which is supported by the meter and pipe 3.

The motor is connected by a gear 155 to drive a gear 157 in the ratio of four to one. The motor itself will perform only exactly one-half a revolution for reasons which will appear below so that gear 157 will rotate exactly two revolutions. This rotation is transmitted to the two studs 115, 117 of the predetermined stop mechanism by the plate 159 which is notched to receive the studs.

As shown in Figures 2 and 3, the end of the trip bar 73 is provided with a longitudinally extending finger 161 which has a transversely extending tail 163.

A bracket 165 is mounted on 153 and a pair of co-planar pawls 154, 156 are pivotally mounted thereon so as to extend upwardly, one on either side of the tail 163. Each pawl has a lever 167, 169 to engage the tail and a step 171, 173 respectively. A spring 175 connects them and urges them toward each other.

The pivot point 177 of pawl 154 is set somewhat above the pivot 179 of pawl 156. Thus as the trip bar 73 reciprocates it trips first one pawl, then the other.

A bell crank 183 is pivotally mounted at 185 on a bracket 187 on base 153. One arm 189 thereof extends between the pawls 154 and 156 while the other arm 191 extends up within the sweep of a cam 193 mounted on the hub 158 of gear 157.

A mercury type switch 195 is mounted on the crank.

A standard 197 rising from bracket 187 supports the shaft 199 on which the gear 157 is mounted. The shaft extends through a slot 201 in disc 159 and the latter is held thereon by a suitable washer 203 and a cotter pin 205.

Wiring diagram

In the wiring diagram shown in Figure 5, the numerals 207 and 209 indicate the power supply mains. Line 209 goes directly to the motor 151 which drives a commutator 211 having two substantially 180 degree segments 213, 215 which have their ends separated.

The main 207 runs to a brush 217 which rides on the commutator. The second lead from the motor runs to a brush 219 which operates on a slip ring 221 which is connected to both segments.

The mercury switch 195 is connected from main 207 to the motor 151.

Operation

Assuming that the predetermined stop mechanism has been preset to the required quantity, the operator will push down on lever 85 to open the valve. This pulls the trip bar 73 to the right (Figure 1) and notch 77 therein engages the latch 75 so that the valve will be held open when pressure on lever 85 is released.

This motion of the trip bar also causes the tail 163 to tilt latch pawl 154 (Figure 3) counterclockwise and draw the step 171 out from under the arm 189 of the bell crank 183. This arm will fall down to and rest upon the step 173 on pawl 156. This motion of the bell crank 183 is not sufficient to close the mercury switch.

Dispensing proceeds and as the cam notches 35 align with the follower 57 on bail 53, the bail will move clockwise (Figure 8) and the nose of lever 63 will ride on cam 61 and eventually into notch 33. The cam will lift lever 63, button 71 and trip bar 73 so that notch 77 will be released from latch 75. The valve spring 83 will close valve 81 and will move the trip bar 73 to the left (Figure 1).

The tail 163 (Figure 3) will move pawl 156 clockwise and will withdraw step 173 from support of the arm 189 with the result that the bell crank rotates clockwise (Figure 2) and closes the mercury switch 195.

This energizes the motor 151, from main 207, switch 195, motor 151 to main 209.

As the motor starts, it rotates the commutator 213, 215 and slip ring 221. As soon as brush 217 rides into contact with a commutator segment, the switch 195 is bridged as follows: main 207, brush 217, commutator segment 213 or 215, slip ring 221, brush 219 to motor 151 and main 209.

The motor drives gears 155 and 157, the plate 159, cap or knob 119 and cam 193. The latter contacts arm 191 of the bell crank, rotates the crank counterclockwise (Figure 2) to open the switch 195 and restore the tail 189 to the control of step 171 on pawl 154. The circuit to the motor is held by the bridge circuit.

The motor rotates exactly 180 degrees, at which point the brush 217 rides off its commutator and stops the motor while knob 119 rotates exactly 720 degrees because of the 4 to 1 gearing. The stud 117 drives the pawls 125, which rotate the ratchets 97, the telescopic shafts 19, 21, 23 and 25, the notches 31 of which pick up the pawls 29 of the cam wheels and move them to the position to which they were originally preset. Thus the reading on the numeral dials will be the same as when the dispensing started. The indicator wheels are reset in the same direction as they are driven during dispensing.

The second cycle is initiated by depressing the valve lever 85.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a repeating counter, a stop mechanism having a number of presettable control elements having zero and preset positions, a trip member having start and stop positions, means urging it to stop position and means under control of said elements for holding it in start position when said elements are out of zero position, means for individually moving said elements to preset position, means for driving said elements from preset to zero position to release said holding means, a motor, means connecting said motor with said control elements for simultaneously restoring them to their initial preset positions, a switch for starting the motor, means responsive to movement of all of said control elements to zero position for closing said switch, means operable by the motor for maintaining it energized, means also operable by the motor for opening said switch and means for stopping the motor when said elements are returned to their preset positions.

2. In a repeating counter, a stop mechanism having a number of presettable control elements having zero and preset positions, a trip member having start and stop positions, means urging it to stop position and means under control of said elements for holding it in start position when said elements are out of zero position, means for individually moving said elements to preset position, means for driving said elements from preset to zero position to release said holding means, means including a motor for resetting said elements, a switch for starting the motor, means normally urging the switch to closed position, means for holding it open, means operable upon movement of the trip member to start position for conditioning the switch for closing and means responsive to movement of the trip member to stop position for closing the switch.

3. In a repeating counter, a stop mechanism having a number of presettable control elements having zero and preset positions, a trip member having start and stop positions, means urging it to stop position and means under control of said elements for holding it in start position when said elements are out of zero position, means for individually moving said elements to preset position, means for driving said elements from preset to zero position to release said holding means, means including a motor for resetting said elements, a switch for starting the motor, means normally urging the switch to closed position, first and second means for holding the switch open, means operable upon movement of the trip member for disabling said first holding means, means operable when said control elements reach zero position for disabling said second holding means.

4. In a repeating counter, a stop mechanism having a number of presettable control elements having zero and preset positions, a trip member having start and stop positions, means urging it to stop position and means under control of said elements for holding it in start position when said elements are out of zero position, means for individually moving said elements to preset position, means for driving said elements from preset to zero position to release said holding means, means including a motor for resetting said elements, a switch for starting the motor, means normally urging the switch to closed position, first and second means for holding the switch open, means operable upon movement of the trip member for disabling said first holding means, means operable when said control elements reach zero position for disabling said second holding means and means operable by the motor for restoring the switch to the control of the first holding means.

5. In a repeating counter, a stop mechanism having a number of presettable control elements having zero and preset positions, means for driving said elements toward zero position, a shaft for presetting each element, means for individually adjusting each shaft to preset its element and means for rotating all of said shafts simultaneously the same amount for resetting said elements, said rotating means including a motor, a first switch, means responsive to movement of said elements to zero position for closing the switch, a second switch, means operated by the motor for closing the second switch and opening said first switch, and means responsive to a predetermined operation of the motor for opening said second switch.

6. In a repeating counter, a stop mechanism having a number of presettable control elements having zero and preset positions, means for driving said elements toward zero position, a shaft for presetting each element, means for individually adjusting each shaft to preset its element and means for rotating all of said shafts simultaneously the same amount for resetting said elements, said rotating means including a motor, a first switch, means normally urging said switch closed, first and second switch holding means, means responsive to the starting of said driving means for rendering said first switch holding means ineffective and said second holding means effective, means responsive to the elements in the zero position for rendering said second holding means ineffective, closing the switch and energizing the motor, a second motor operated switch connected to maintain said motor energized for a predetermined rotation, and means operable by said motor for restoring said first switch to the control of said first holding means.

7. In a repeating counter, a stop mechanism having a number of presettable control elements having zero and preset positions, means for driving said elements toward zero position, a shaft for presetting each element, means for individually adjusting each shaft to preset its element and means for rotating all of said shafts simultaneously the same amount for resetting said elements, said rotating means including a motor, a first switch, means normally urging said switch closed, a first releasable latch for holding said switch open, a second releasable latch for receiving said switch after it is released by said first latch, means responsive to the starting of said driving means for releasing said first latch, means responsive to the elements in the zero position for releasing said second latch to close said switch and energize said motor, a second motor operated switch connected to maintain said motor energized for a predetermined rotation to reset the elements and means operable by the motor for restoring said first switch to the control of said first latch.

RALPH B. PRESSLER.

REFERENCES CITED

The following references are of record in the file of this patent:

UNITED STATES PATENTS

| Number | Name | Date |
|---|---|---|
| 1,349,256 | Bechtold | Aug. 10, 1920 |
| 1,866,523 | Alexander | July 12, 1932 |
| 2,030,624 | Ek et al. | Feb. 11, 1936 |
| 2,082,391 | Granberg | June 1, 1937 |
| 2,116,785 | Griffith | May 10, 1938 |
| 2,196,805 | Berck | Apr. 9, 1940 |
| 2,322,712 | Hazard | June 22, 1943 |
| 2,340,743 | Griffith | Feb. 1, 1944 |
| 2,415,854 | Sheffield | Feb. 18, 1947 |